United States Patent [19]

Evrard et al.

[11] Patent Number: 5,284,642

[45] Date of Patent: Feb. 8, 1994

[54] ALKALI OR ALKALINE EARTH METAL FERRATES, THEIR PREPARATION AND THEIR INDUSTRIAL APPLICATIONS

[75] Inventors: Omer J. Evrard, 13, Avenue du Vieux Chateau, 54500 Van Doeuvre; Rene A. Gerardin, Villers-les-Nancy; Nathalie Schmitt, Nancy; Jean-Luc Evrard, Strasbourg, all of France

[73] Assignees: Centre International de l'Eau de Nancy (NAN.C.I.E.); Omer Evrard, both of Vandoeuvre-les-Nancy, France

[21] Appl. No.: 855,706

[22] PCT Filed: Oct. 26, 1990

[86] PCT No.: PCT/FR90/00775

§ 371 Date: May 6, 1992

§ 102(e) Date: May 6, 1992

[87] PCT Pub. No.: WO91/07352

PCT Pub. Date: May 30, 1991

[30] Foreign Application Priority Data

Nov. 8, 1989 [FR] France .................. 89 14658

[51] Int. Cl.$^5$ ............................................. C01G 49/02
[52] U.S. Cl. ...................................... 423/594; 210/716; 210/721; 210/758; 252/186.25; 252/186.33; 423/596; 423/599; 423/600
[58] Field of Search ................ 210/721, 758, 716; 252/186.1, 186.25, 186.33, 187.31; 423/593, 594, 596, 599, 600

[56] References Cited

U.S. PATENT DOCUMENTS

| | | | |
|---|---|---|---|
| 2,758,090 | 8/1956 | Mills et al. | 252/186 |
| 2,917,461 | 12/1959 | Brixner | 252/62.5 |
| 3,484,376 | 12/1969 | Paris et al. | 252/62.3 |
| 3,607,863 | 9/1971 | Dosch | 260/209 |
| 4,405,573 | 9/1983 | Deininger et al. | 423/594 |
| 4,454,494 | 6/1984 | Williams et al. | 338/34 |
| 4,551,327 | 11/1985 | Honma et al. | 423/594 |
| 4,724,135 | 2/1988 | Cirjak et al. | 423/593 |
| 4,737,355 | 4/1988 | Guttmann et al. | 423/593 |
| 4,816,243 | 3/1989 | Guttmann et al. | 423/593 |
| 4,983,306 | 1/1991 | Deininger et al. | 210/724 |

FOREIGN PATENT DOCUMENTS

| | | |
|---|---|---|
| 0082590 | 6/1983 | European Pat. Off. |
| 2635318 | 2/1990 | France |
| 63-162095 | 7/1988 | Japan |

*Primary Examiner*—Peter A. Hruskoci
*Attorney, Agent, or Firm*—Young & Thompson

[57] ABSTRACT

The ferrates in solid state have the formula:

$$M(Fe, X)O_4$$

in which M designates two atoms of Na or K or one atom of Ca or Ba, and X is an atom whose cation has the electronic structure of a rare gas. These ferrates are isomorphs of ferrates of the formula $M FeO_4$, in which M has the same definition as above. Used particularly for the treatment of water, by oxidation.

1 Claim, No Drawings

ALKALI OR ALKALINE EARTH METAL FERRATES, THEIR PREPARATION AND THEIR INDUSTRIAL APPLICATIONS

The present invention relates to new alkali or alkaline earth metal ferrates.

The invention is also concerned with their process of preparation and their industrial applications.

It is known that the ferrates of the formula $M\ FeO_4$, in which M is an atom of Ca or Ba, or two atoms of Na or K, are powerful oxidizers.

When they are introduced into water, they liberate oxygen according to the following reaction:

$$2\ FeO_4{}^{2-} + 5\ H_2O \rightleftharpoons 2\ Fe(OH)_3 + 4\ HO^- + 3/2\ O_2$$

However, these ferrates are not stable, so that they cannot be stored for long periods. This instability is incompatible with industrial use of these ferrates as oxidizers.

The object of the present invention is to provide stable ferrates, which is to say industrially usable particularly as oxidizers.

According to the invention, these ferrates are characterized in that they have the formula:

$$M\ (Fe,\ X)\ O_4$$

in which M designates two atoms of Na or K or one atom of Ca or Ba, and X is an atom whose cation has the electronic structure of a rare gas, said ferrates being isomorphs of ferrates of the formula $M\ FeO_4$, in which M is as defined above.

Thus the ferrates according to the invention are distinguished from ferrates of the formula $M\ FeO_4$ by the fact that certain Fe atoms have been replaced by atoms of X.

The formula $M(Fe, X)O_4$ can be established by classical chemical analysis.

It has been established by X-ray diffraction that the ferrates $M(Fe, X)O_4$ have a crystalline structure identical to that of $M\ FeO_4$ ferrates. Only the dimension of the crystal lattice varies slightly because of the presence of the X atoms, particularly when the dimension of this latter is different from that of the atoms of Fe that they partially replace.

The stability of the ferrates according to the invention can be explained by the fact that the cation of the atom X has the electronic structure of a rare gas.

Thus the X atom can be selected from among the following: Al, Si, P, S, Cl, Mo, Mn, Cr and the mixture of these atoms.

The corresponding cations, namely:

$Al^{3+}$, $Si^{4+}$, $P^{5+}$, $S^{6+}$, $Cl^{7+}$, $Cr^{6+}$, $Mo^{6+}$ and $Mn^{7+}$ have the electronic structure of a rare gas.

According to a preferred embodiment of the invention, the ratio $Fe/(X+Fe)$ (number of atoms of Fe over that of the $(X+Fe)$ atoms) is between 0.5 and 0.9.

When the ferrates according to the invention fulfill this supplemental condition, they have both a high stability and an excellent oxidizing power.

According to another aspect of the invention, the process of preparation of the ferrates according to the invention is characterized in that there is caused to react the compound M OH and an oxidizer, with a chemical compound in which the atoms of Fe are combined with the X atoms.

The compound M OH can be NaOH, K OH, Ca(OH)$_2$ or Ba(OH)$_2$.

Thus, the compound M OH and an oxidizer can be reacted with iron sulphate, iron silicate, iron phosphate, iron chromate, iron molybdate, iron tungstate, iron manganate, iron perchlorate or iron aluminate.

By way of example, to prepare the ferrate of the formula:

$$M_2(Fe,\ S)O_4$$

in which M is an atom of Na or K, there is introduced iron sulfate in solid state into a solution of soda or potash, agitation is conducted and the product obtained is dried and an oxidizer is added thereto.

To this end, at least the stoichiometric quantity of iron sulphate is caused to react with the soda or potash.

According to another embodiment of the process according to the invention, there is caused to react with the soda or potash a mixture of iron sulphate and Ca hypochlorite.

The compound of the formula $M_2(Fe, S)O_4$ is the preferred ferrate according to the invention, because it can be obtained from iron sulphate $FeSO_4$. $7\ H_2O$ which is an inexpensive chemical product. It is particularly a residue of the industrial production of titanium.

There will now be developed the theoretical aspects which are fundamental to the present invention.

It is well known that the best known iron salts are those in which the metallic element has degrees of oxidation II and III, namely Fe(II) which has a mildly reducing nature, and Fe(III) which has a mild oxidizing nature.

The degrees of oxidation higher than III are on the other hand much less known, whether the corresponding compounds are limited such as $BaFeO_3$ to the degree of oxidation IV, or whether the salts are difficult to synthesize and less stable with time such as $K_2FeO_4$ for the degree of oxidation VI.

It has long been known that $K_2FeO_4$ is an isomorph of $K_2CrO_4$ or $K_2SO_4$, and that likewise $BaFeO_4$ has the same structure as $BaCrO_4$ or $BaSO_4$.

The essential difference between these types of compounds resides in their stability: thus, although sulphates or chromates are said to be stable in the solid state, nevertheless the ferrates decompose easily and, because of this, are difficult to handle. These latter also have the property of oxidizing water with the release of oxygen and the precipitation of ferric hydroxide; only manganese, in its radical $MnO^-{}_4$ has the property of oxidizing water with the release of oxygen, but the reaction kinetic is slow such that the crystals of permanganate are stable with time.

Among the ferrates, the radical $FeO_4{}^{2-}$ has a tetrahedral structure.

The concept on which the invention is based consists in stabilizing this tetrahedric radical by replacing a portion of the iron atoms in the solid state. The stabilization of the tetrahedric radical $FeO_4{}^{2-}$ is obtained by the partial replacement of iron with another X element existing in the form $XO_4{}^{m-}$ (m being a whole number), such as $SiO_4{}^{4-}$, $PO_4{}^{3-}$, $SO_4{}^{2-}$, $ClO_4{}^-$, $CrO_4{}^{2-}$, $MoO_4{}^{2-}$, $WO_4{}^{2-}$, $MnO^{4-}$ and $AlO_4{}^{5-}$ which are well known for their stability.

The molecular orbital theory applied to a tetrahedric radical $XO_4{}^{m-}$ shows that the electrons of the four oxygen atoms come to occupy all the connecting orbits σ and π in the radical. The anti-connection energy orbits immediately above are not occupied if the cation $X^{(8-m)+}$ has an electronic structure of a rare gas as for example $Al^{3+}$, $Si^{4+}$, $P^{5+}$, $S^{6+}$, $Cl^{7+}$, $Cr^{6+}$, $Mo^{6+}$ and $Mn^{7+}$. On the other hand, the tetrahedron $FeO_4^{2-}$ is destabilized if the cation $X^{(8-m)+}$ has d electrons ($d^1$ for $Mn^{6+}$, $d^2$ for $Fe^{6+}$) because in this case the electrons will enter the anti-connection orbits. It will thus be understood that the substitution of Fe (VI) by a cation with the electronic structure of a rare gas stabilizes the tetrahedral system, because this substitution involves a diminution of the concentration of electrons in the anti-connection orbits.

There will be given hereafter by way of non-limiting example the operative manner of preparation of a sulphate according to the invention having the formula:

$$K_2(Fe, S)O_4$$

There is added to 100 parts by weight of $FeSO_4 \cdot 7 H_2O$, 70 parts by weight of $Ca(ClO)_2$ and 200 parts by weight of K OH.

Stirring is conducted for 10 minutes, then oven drying is conducted for 3 hours.

There is thus obtained a solid product comprising:

$K_2$ (Fe, S) $O_4$, in which the number of atoms of Fe is substantially equal to that of S;

KCl $Ca(OH)_2$

The KCl can be separated from the mixture, by washing the latter with pure methanol or containing up to 20% water.

The $Ca(OH)_2$ is not troublesome for the contemplated use in the present invention.

The solid product obtained, freed from KCl, can be stored indefinitely for example in drums or bags. This product can therefore be utilized as an oxidizer, particularly for the purification of water, namely drinking water and swimming pool water.

When the product according to the invention is placed in contact with water, the iron precipitates in the form of iron hydroxide and the release of oxygen oxidizes the organic materials contained in the water, as well as the mineral materials such as the sulphates.

The precipitation of iron hydroxide is beneficial, because this latter acts as a flocculent.

Of course, the invention is not limited to the examples that have been described and there can be given to these numerous modifications without departing from the scope of the invention.

We claim:

1. Ferrates in solid state having the formula $$M (Fe, X)O_4$$

in which M designates two atoms of Na or K or one atom of Ca or Ba, and X is an atom selected from the group consisting of Al, Si, P, S, Cl, Cr, Mo, Mn and a mixture thereof, said ferrates being isomorphs of ferrates of the formula M $FeO_4$, in which M has the same definition as above, wherein the ratio Fe/(X+Fe) (number of atoms of iron over that of the atoms of (X+Fe) is between 0.5 and 0.9.

* * * * *